United States Patent
Dondemadhahalli et al.

(10) Patent No.: US 10,805,180 B2
(45) Date of Patent: Oct. 13, 2020

(54) ENTERPRISE CLOUD USAGE AND ALERTING SYSTEM

(71) Applicant: EMC IP HOLDING COMPANY LLC, Hopkinton, MA (US)

(72) Inventors: Narasimha Dondemadhahalli, Shrewsbury, MA (US); Julie Dougherty, Natick, MA (US); Rajanikanth Markala, Shrewsbury, MA (US); Ramakanth Muthyala, South Grafton, MA (US); Somnath Upadhyay, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/169,300

(22) Filed: Oct. 24, 2018

(65) Prior Publication Data

US 2020/0136927 A1   Apr. 30, 2020

(51) Int. Cl.
| | |
|---|---|
| H04L 12/24 | (2006.01) |
| H04L 12/911 | (2013.01) |
| G06F 9/50 | (2006.01) |
| G06F 16/22 | (2019.01) |
| G06F 16/907 | (2019.01) |

(52) U.S. Cl.
CPC ........ *H04L 41/5032* (2013.01); *G06F 9/5072* (2013.01); *G06F 9/5077* (2013.01); *G06F 16/221* (2019.01); *G06F 16/907* (2019.01); *H04L 41/5009* (2013.01); *H04L 47/74* (2013.01); *H04L 47/822* (2013.01); *H04L 47/823* (2013.01); *G06F 2209/5019* (2013.01); *G06F 2209/5022* (2013.01); *H04L 41/22* (2013.01); *H04L 41/5096* (2013.01)

(58) Field of Classification Search
CPC . H04L 41/5032; H04L 41/5009; H04L 41/22; H04L 41/5096; H04L 47/74; H04L 47/822; H04L 47/823; G06F 16/907; G06F 16/221; G06F 9/5072; G06F 9/5077; G06F 2209/5019; G06F 2209/5022
See application file for complete search history.

(56) References Cited

U.S. PATENT DOCUMENTS

| | | | |
|---|---|---|---|
| 10,230,592 B2* | 3/2019 | Scholz | H04L 41/5032 |
| 2011/0131335 A1* | 6/2011 | Spaltro | G06F 9/5072 |
| | | | 709/228 |
| 2013/0185413 A1* | 7/2013 | Beaty | G06F 9/5072 |
| | | | 709/224 |
| 2018/0027006 A1* | 1/2018 | Zimmermann | H04L 63/0245 |
| | | | 726/11 |

* cited by examiner

*Primary Examiner* — Azizul Choudhury
(74) *Attorney, Agent, or Firm* — Krishnendu Gupta; Anne-Marie Dinius

(57) ABSTRACT

The systems, methods and computer products disclosed herein relate to an improved enterprise cloud usage and alerting system used in conjunction with Platform-as-a-Service (PaaS) environments. The embodiments we disclose enable a user to obtain consolidated usage and performance information for disparate foundations within a PaaS environment. We disclose an application program interface that couples to a PaaS platform for purposes of obtaining resource usage metrics. These resource usage metrics, which span a plurality of foundations are then aggregated into a consolidated view, which can be used for platform management, system planning, failure troubleshooting, and the like.

18 Claims, 9 Drawing Sheets

| LAYER 1 | PHYSICAL LAYER |
| LAYER 2 | DATA LINK LAYER |
| LAYER 3 | NETWORK LAYER |
| LAYER 4 | TRANSPORT LAYER |
| LAYER 5 | APPLICATION LAYER |

CLOUD COMPUTING OSI MODEL

OPERATIONS REPORTING DASHBOARD

| Org. Name | No. of Spaces | No. of Apps. | No. of Apps. Instances | No. of Services | Total Memory (GB) | Used Memory (GB) |
|---|---|---|---|---|---|---|
| AICS360Org(xxx) | 4 | 136 | 288 | 38 | 320.0 | 252.5(78.91%) |
| AICSHDOrg(xxx) | 5 | 79 | 151 | 49 | 180.0 | 111.9(62.17%) |
| AICSMOrg(xxx) | 1 | 0 | 0 | 3 | 32.0 | 0(0.00%) |
| bdlOrg(xxx) | 1 | 5 | 11 | 5 | 16.0 | 12.5(78.11%) |
| CADOrg(xxx) | 1 | 2 | 3 | 5 | 32.0 | 5.0(15.63%) |
| ClmOrg(xxx) | 2 | 45 | 61 | 7 | 200.0 | 90.3(45.15%) |
| CNDP-AWSOrg(xxx) | 1 | 7 | 13 | 6 | 16.0 | 7.1(44.38%) |
| CNDP-AWSOrg(xxx) | 1 | 2 | 3 | 3 | 16.0 | 1.0(6.23%) |
| CNIEAPPRODOrg(xxx) | 3 | 110 | 222 | 64 | 512.0 | 235.2(45.94%) |
| CNIEAPPRODOrg(xxx) | 0 | 0 | 0 | 0 | 64.0 | 0(0.00%) |

ENTERPRISE CLOUD USAGE AND ALERTING SYSTEM

FIELD OF THE INVENTION

This disclosure relates to cloud infrastructure environments, and more particularly to a consolidated usage and alerting system for Enterprise Cloud operations, maintenance and monitoring.

BACKGROUND

Many data centers in use today employ a cloud computing paradigm. As is well known, the cloud computing paradigm is a model that provides ubiquitous, convenient, on-demand network access to a shared pool of configurable computing resources (e.g., networks, servers, storage, applications, and services), as part of a cloud infrastructure, that can be rapidly provisioned and released with minimal management effort or service provider interaction.

Those familiar with Software-as-a-Service ("SaaS"), Platform-as-a-Service ("PaaS"), and Infrastructure-as-a-Service ("IaaS") will recognize the familiar pyramidal relationship between these three environments depicted in FIG. 1A. Similarly, FIG. 1B depicts an OSI layer for the cloud stack. Persons skilled in the art recognize that SaaS cloud computing resides in the Application Layer, PaaS resides in both the Network Layer and the Translation Layer, and IaaS resides in the bottom three layers, namely the Physical Layer, the Data Link Layer, and the Network Layer.

Application deployment on a cloud infrastructure has been substantially automated by the development and implementation of tools that employ a Platform-as-a-Service (PaaS) approach. PaaS is typically understood to be a platform-centric model for development of applications or services. Said differently, PaaS provides infrastructure, such as, without limitation, data storage, data compression, and data deduplication, with added services or platforms for customers to use.

One example of such a PaaS approach is implemented in the CloudFoundry® product available from Pivotal Software, Inc. (Palo Alto, Calif.), which provides application developers with the functionality of a versatile PaaS application deployment layer. Additional examples are Microsoft Azure, Amazon AWS, Oracle Cloud PaaS, among many others. While the exemplary embodiments and techniques discussed herein will use CloudFoundry and Dell EMC product lines as example use cases, those of skill in the art will recognize the universal applicability across various vendor PaaS architectures.

One of the main benefits of the PaaS application deployment layer is that, by controlling deployment of an application to a specific platform (e.g., specific data center or cloud), the PaaS application layer abstracts the application developer away from the specific hardware architecture of the data center/cloud where the application is intended to be deployed. This increases development speed and also facilitates speed of deployment for information technology (IT) operators.

A typical PaaS architecture is divided into foundations. Exemplary PaaS foundations 100 are depicted in FIG. 1C. They include: a development foundation 112, a test foundation 114, and a production area 116. Historically, users have had little to no consolidated view of these foundations, also called environments. In order to obtain performance usage and metrics, users have to log into each environment in order to obtain usage metrics and application metrics. Developers typically cannot access consolidated information related to memory, persistence, usage, operational information and the like, which are critical data points for proactively planning infrastructure scaling and for fulfilling reporting obligations.

Worse yet, each organization is also typically separated, requiring users to log into each organization individually in order to obtain performance information. Still worse, if there is an issue with an application or service being executed on the PaaS, there is no easy way to determine where the application is running, which is a critical first step in the diagnostic process.

The harmonizing theme of each of these problems is a lack of a bird's eye view inherent in PaaS environments, which results in added costs, unpredictable performance, delays, and loss of agility. There is thus a need for a consolidated usage, alert, and searching system for enterprise cloud environments.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter that is set forth by the claims presented below. All examples and features mentioned below can be combined in any technically possible way.

In some embodiments, we disclose a system for providing a consolidated view of a Platform-as-a-Service (PaaS) environment running on a cloud network comprising: an analysis system including one or more processors coupled to the PaaS environment; computer-executable program logic encoded in a memory of one or more computers enabled to analyze information using the analysis system, wherein the computer-executable program logic is configured for the execution of: measuring one or more resource usage metrics for each of a plurality of foundations within the PaaS environment; consolidating the one or more resource usage metrics into a report; and providing the consolidated report to an end user.

In alternate embodiments, we disclose a method for providing a consolidated view of a Platform-as-a-Service (PaaS) environment running on a cloud network comprising: measuring one or more resource usage metrics for each of a plurality of foundations within the PaaS environment; consolidating the one or more resource usage metrics into a report; and providing the consolidated report to an end user.

In yet alternate embodiments, we disclose a non-transitory computer readable medium with program instructions stored thereon for performing the following acts: measuring one or more resource usage metrics for each of a plurality of foundations within the PaaS environment; consolidating the one or more resource usage metrics into a report; and providing the consolidated report to an end user.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Illustrative embodiments may be described herein with reference to exemplary cloud infrastructure, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data center," "data processing system," "computing system," "data storage system," and the like as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the following terms and phrases have the following illustrative meanings: "application" generally refers to one or more software programs designed to perform one or more functions; "metadata" generally refers to data that describes or defines other data; "enterprise cloud" generally refers to a computing environment residing behind a firewall that delivers software, infrastructure, and platform services to an enterprise.

Application deployment via PaaS tools, such as CloudFoundry® and, as another example, OpenShift® (Red Hat, Inc. of Raleigh, N.C.), typically limit the deployment of an application to a specific cloud, without understanding the capabilities of the underlying infrastructure. This can result in a "siloed" approach to managing resources across multiple foundations.

Figures 1A, 1B:
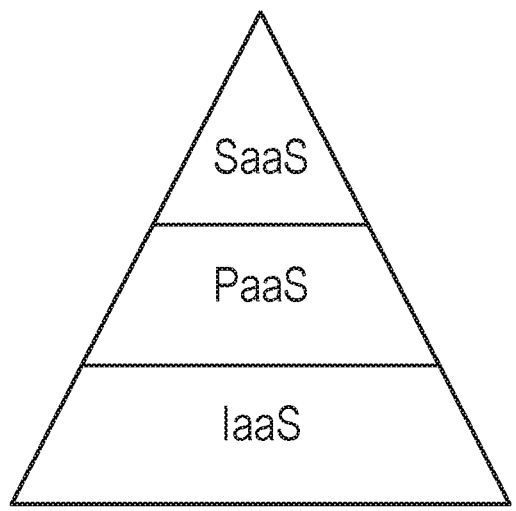
FIG. 1A depicts an architectural relationship between Software-as-a-Service, Platform-as-a-Service, and Infrastructure-as-a-Service environments.
FIG. 1B is a hierarchical representation of the layers within the cloud stack.
Figure 1C:
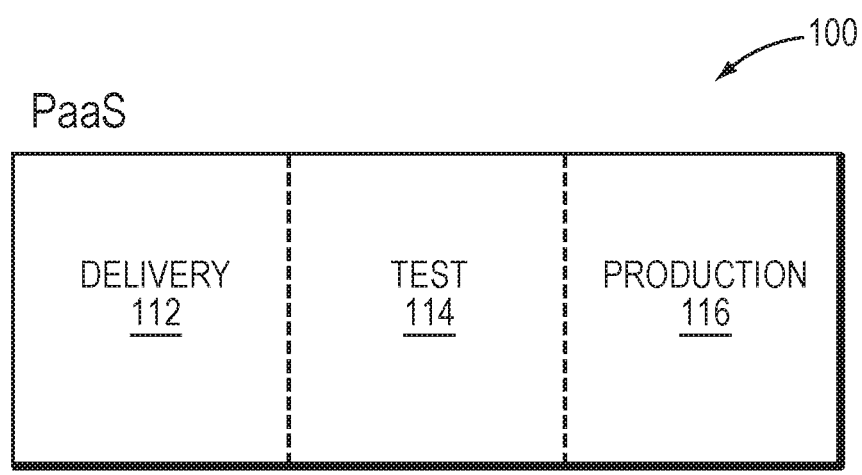
FIG. 1C depicts exemplary foundations contained within a Platform-as-a-Service (PaaS) environment.

With reference to FIG. 1A, embodiments herein are built within the Platform-as-a-Service layer, which sits between the Infrastructure-as-a-Service layer and the Software-as-a-Service layer. In some embodiments, the IaaS layer could be a VMWare VSphere,®, a VMWare ESXi, a VMWare ESX or other Hypervisors provided by other vendors. Generally, the teachings herein are designed to integrate into any IaaS platform. For more detailed information regarding the VSphere IaaS platform and architecture, see generally https://www.vmware.com/pdf/vsphere4/r40/vsp_40_intro_vs.pdf, the entire contents of which are hereby incorporated by reference.

Similarly, embodiments we disclose support Linux and Windows operating systems.

Figure 2:
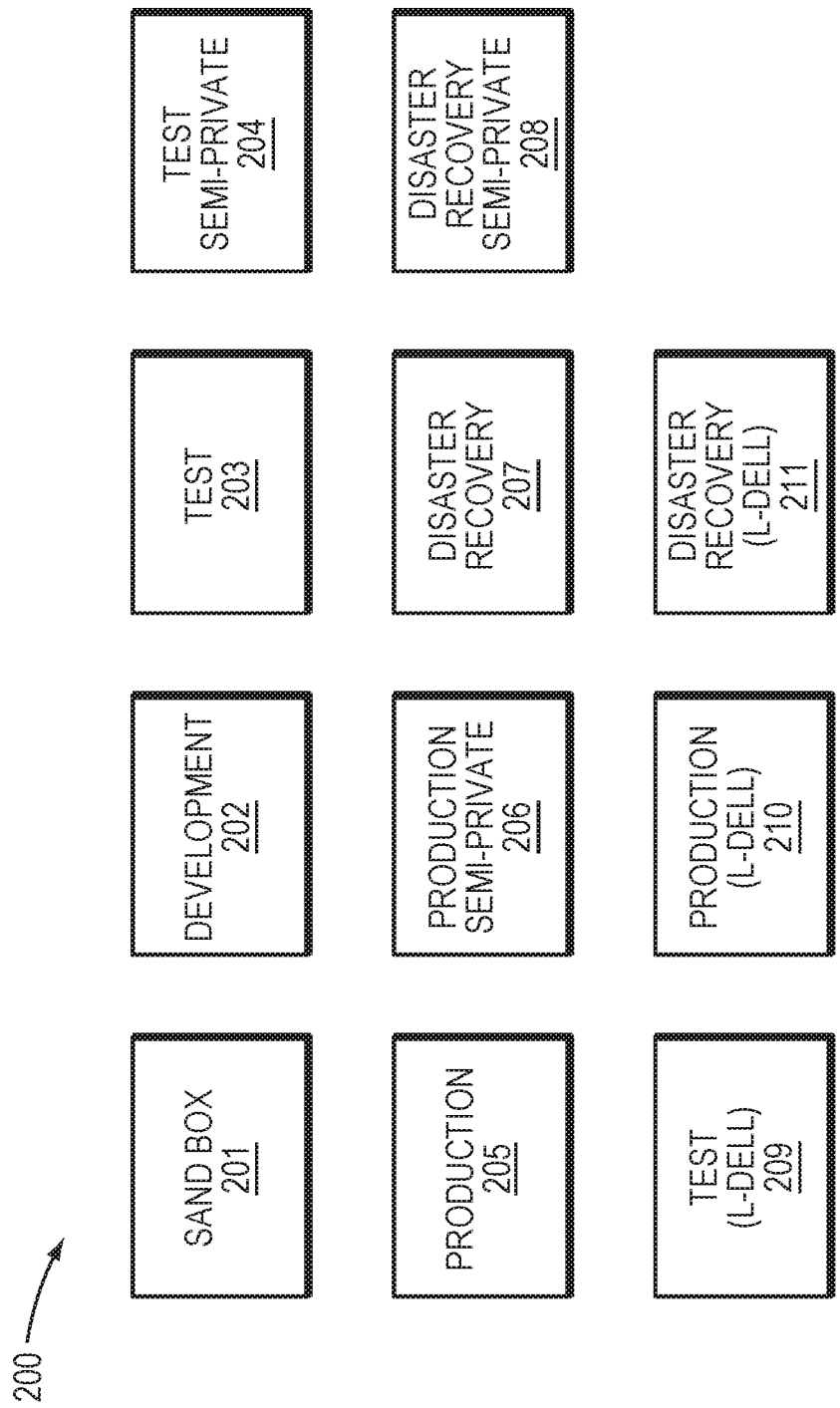
FIG. 2 is a functional block diagram of an exemplary Platform-as-a-Service environment having a plurality of foundations.

Referring to FIG. 2, we show an embodiment of a PaaS environment 200, interchangeably called a PaaS layer, having a plurality of foundations 201-211. In this exemplary embodiment, the foundations comprise: a sandbox foundation 201, a development foundation 202, a test foundation 203, a test semi-private foundation 204, a production foundation 205, a production semi-private foundation 206, a disaster recovery foundation 207, a disaster recovery semi-private foundation 208, a test (legacy Dell) foundation 209, a production (legacy Dell) foundation 210, and a disaster recovery (legacy Dell) foundation 211.

One of the challenges the embodiments disclosed herein overcome is the ability to provide a consolidate measurement and view of the resources being consumed on each individual foundation 201-211. Each of these foundations 201-211 has an ecosystem 300 similar to that depicted in FIG. 3. As can be seen, the ecosystem 300 includes a dynamic router 302, a cloud controller 304, a user account and authentication/login server 306 a health manager 308, a service broker node 310, a DEA pool 314, which includes applications 316, build packs 318, and a logging node 320, user provided service instances 322, a messaging platform (e.g., NATS) 324, and a management tool (e.g., cloud foundry BOSH) 326.

In operation, an organization may divide different portions of its organization into different foundations with a PaaS environment. For example, some aspects of the organization may be tasked with developing solutions that would leverage an IaaS platform and either interact with pieces of a SaaS layer or become part of a SaaS layer. These members may consume resources in the Sandbox 201 or Development 202 foundations. Disparate members of the organization may be responsible for testing or development, which would likely place usage demands on the Test 203, Test Semi-Private, 204, Production 205, or Production Semi-Private Foundations 206.

Historically, these individuals would not be able to easily discern resource usage metrics across foundations. In this situation, the current systems fail to provide a connected, holistic view of the PaaS environment. Embodiments herein overcome these disadvantages by providing users with an integrated, high-level view of resource usage metrics, which can be used for planning purposes, reporting, marketing, diagnostics, and the like. Some of the benefits realized by embodiments include: (1) monitoring platform capacity from a single vantage point; (2) system alerting capabilities; (3) coordinating required resources to enable on-time production releases; (4) daily time savings inherent in providing a consolidated view of resource usage as opposed to requiring piecemeal investigation into segregated sectors; (5) automated consolidation as opposed to historic manual consolidation; (6) faster problem identification, thereby enabling quicker resolutions; (7) better forecasting and trending capabilities.

Figure 3:
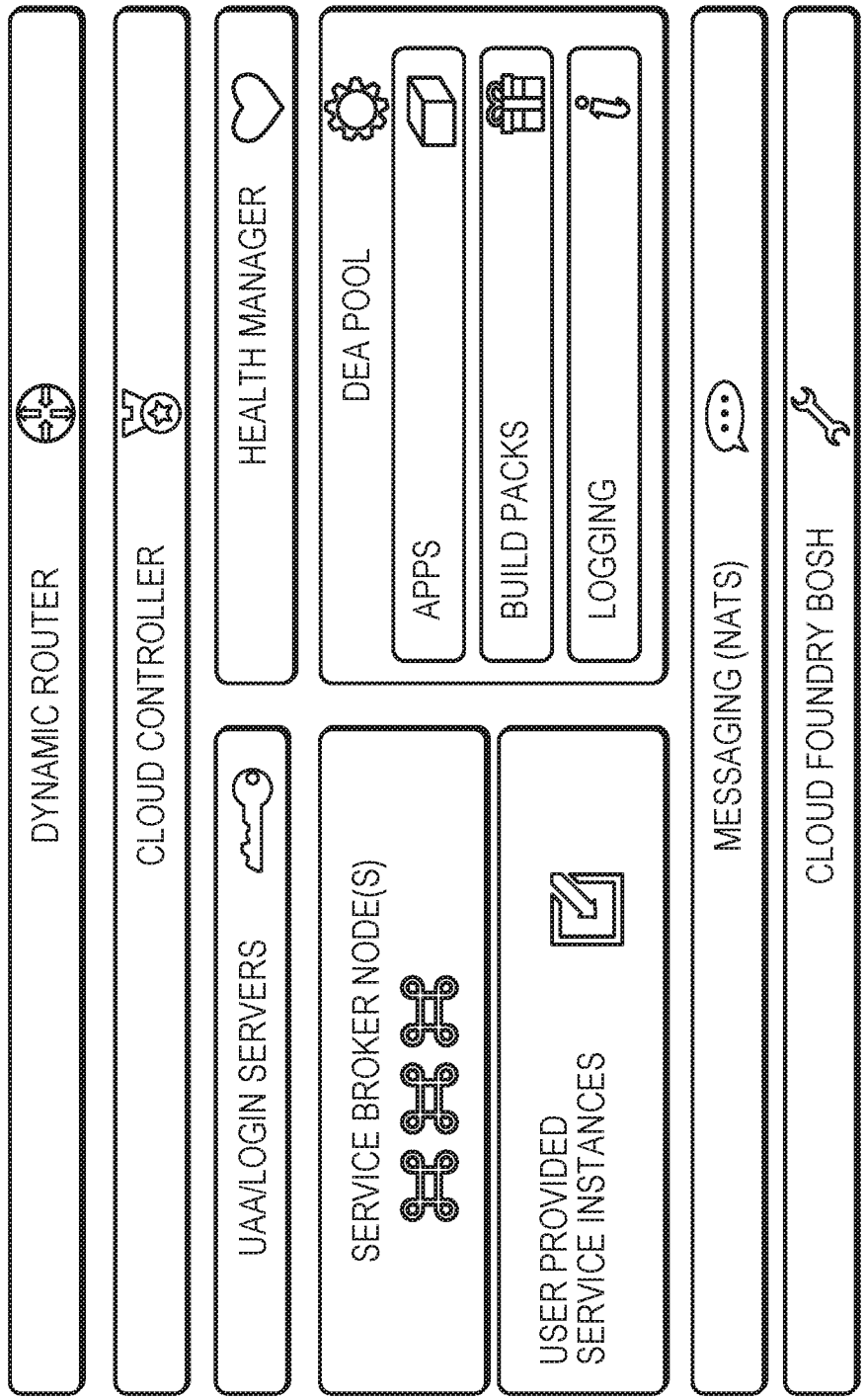
FIG. 3 is an architectural block diagram of an ecosystem of a foundation within a PaaS environment.

Referring to FIG. 2 and FIG. 3, historically, each foundation 201-211 would have an ecosystem similar to that shown in FIG. 3.

Figure 4:
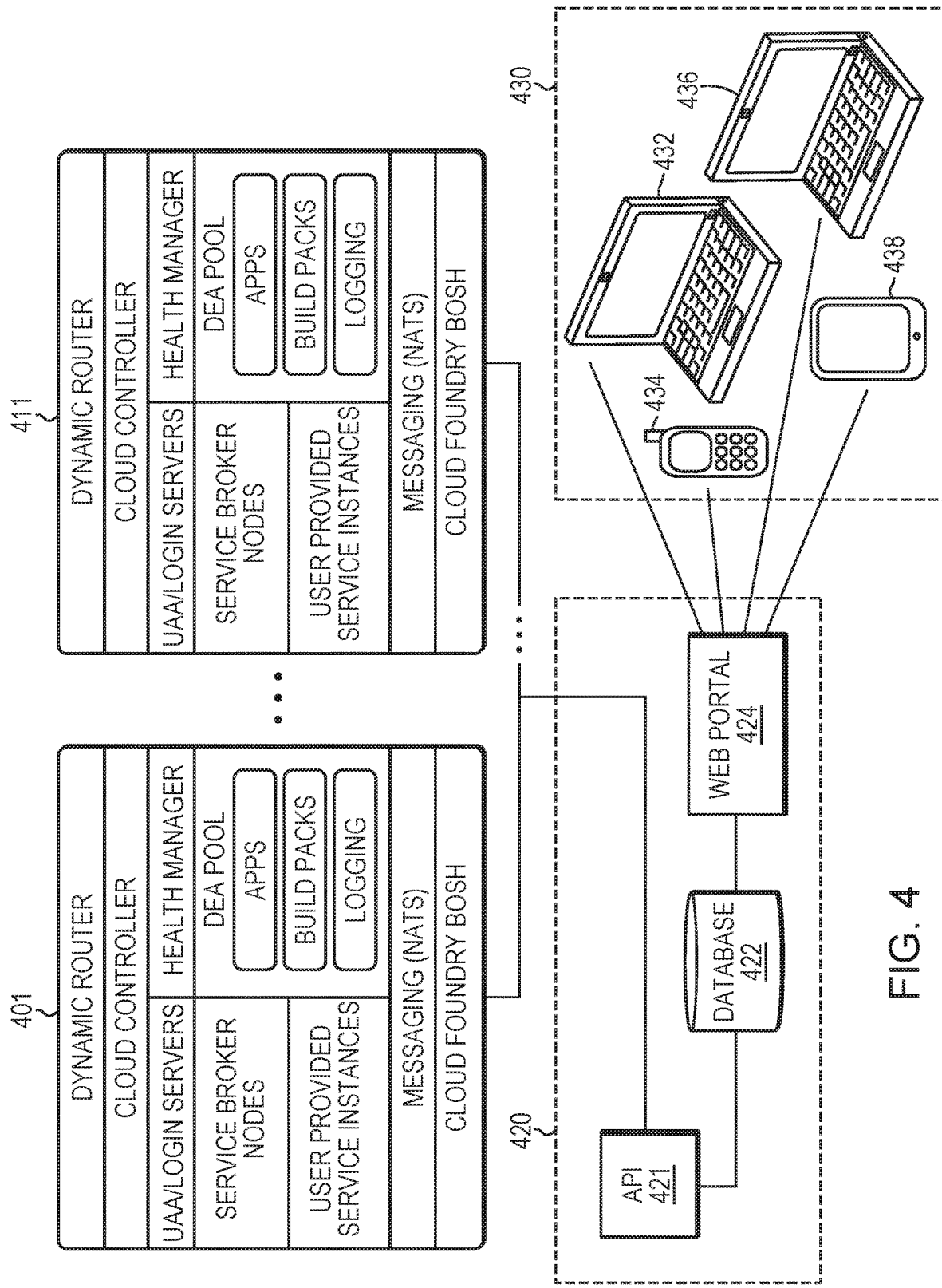
FIG. 4 depicts an architectural block diagram of a system according to embodiments disclosed herein.

FIG. 4 depicts a system for performing embodiments herein. Specifically, FIG. 4 depicts a plurality of foundations 401, 411 coupled to an analysis system 420, which in some embodiments is coupled to a display platform 430. Although we show only two foundations 401, 411, embodiments are not so limited and can include eleven foundations, similar to what was depicted in FIG. 2, or any number of foundations within a particular PaaS environment.

The analysis system 420 comprises one or more processors (not shown) hosting an Application Program Interface (API) 421, a database 422 for storage of data, including but not limited to resource usage metrics obtained from foundations 401, 411, and a web portal 424 enabled to provide a consolidated report to end users via display platform 430. In some embodiments, display platform 430 could have a number of display devices attached thereto, such as, computers 432, 436, mobile device 434 and tablet 438.

In addition to hosting API 421, the processors in analysis system 420 are further enabled to obtain and analyze resource usage metrics obtained from foundations 401, 411, consolidate the resource usage metrics, and prepare myriad consolidated reports to be displayed to users on a display platform 430 via web portal 424. In some embodiments, resource usage metrics could be one or more of: a memory usage, a disk usage, a number of hyper-text transfer protocol (HTTP) transactions, a throughput value for each HTTP transaction, a memory usage value for each of a plurality of applications running within the plurality of foundations, an occurrence of a crash event for one of the plurality of applications, a PaaS ecosystem alert, a value metric, a router usage, a cloud controller usage, or a Traffic controller metric. Resource usage metrics could be data or metadata.

In embodiments, users can set thresholds for resource usage metrics. These thresholds could be used for various reasons, such as without limitation, sending an alarm in the case of system malfunction, reaching a capacity threshold, identifying a usage pattern such as a new application being used within the PaaS environment, identifying memory usage per organization or foundation, and the like. In these embodiments, the analysis system 420 could analyze threshold input from users in order to monitor when a threshold is met. Additionally, analysis system 420 could provide an alert via web portal 424 to users on the display platform 430. Similarly, analysis system 420 could forecast future resource needs or trends of foundations 401, 411 based on historic information stored in database 422.

In some embodiments, analysis system 420 can be configured to store resource usage metrics in database 422 with a foundation-specific keyword so as to enhance the searchability within metadata or data obtained from foundations 401, 411. In alternate embodiments, some resource usage metrics could be stored in a cache memory, flash memory, or on disk drives.

In terms of resource usage metrics obtained from the foundations, these could be, without limitation, data or metadata related to Virtual Machines, Diego Cells, Cloud Controller data, Traffic Controller statistics, Router data, Applications running within the PaaS (e.g., Redis, MySQL, etc.), login servers, user provided service instances, health management, memory allocations across organizations or foundations, and the like.

In embodiments, Virtual Machines are systems where a software component can run in, for example, a Pivotal Cloud Foundry ecosystem component. One example could be Go Router.

In embodiments, a Cloud Controller provides REST API endpoints for clients to access the system. The Cloud Controller maintains a database with tables for organizations, spaces, services, user roles, and more.

In embodiments, a Traffic Controller handles client requests for logs. It gathers and collates messages from all Doppler servers, and provides external API and message translation as needed for legacy APIs. The Traffic Controller also exposes the Firehose.

Figure 5:
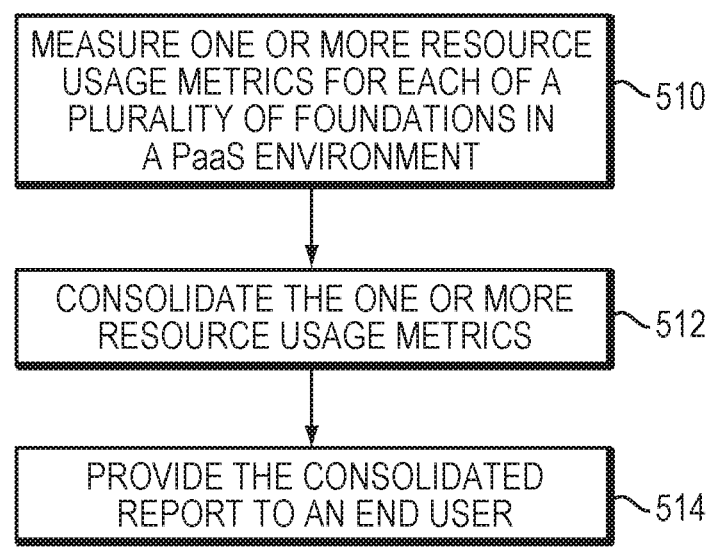
FIG. 5 is a flow chart of method steps according to embodiments disclosed herein.

FIG. 5 depicts method steps for performing method embodiments herein as well as steps that could be executed using a non-transitory computer readable medium to perform certain functions. In one embodiment, we measure 510 one or more resource usage metrics for each of a plurality of foundations within a PaaS environment. We then consolidate 512 the one or more resource metrics into a report. And then, we provide 514 the consolidate report to an end user. In some embodiments, providing 514 could be visually displaying the consolidated report to the end user. In alternate embodiments, providing 514 could be storing the consolidated report for future reference.

Figure 6:
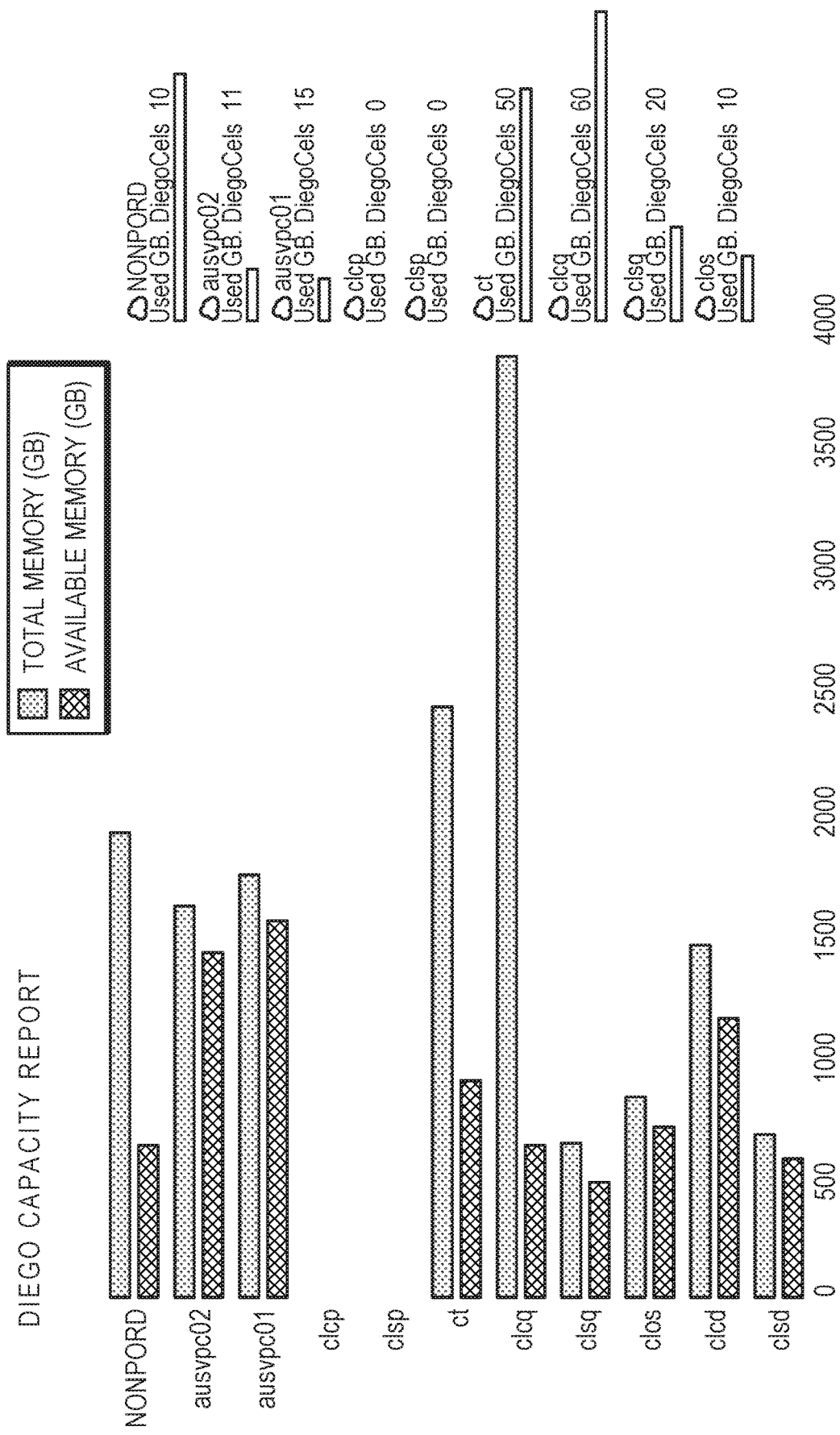
FIG. 6 shows an exemplary consolidated report created using embodiments herein.
Figure 7:
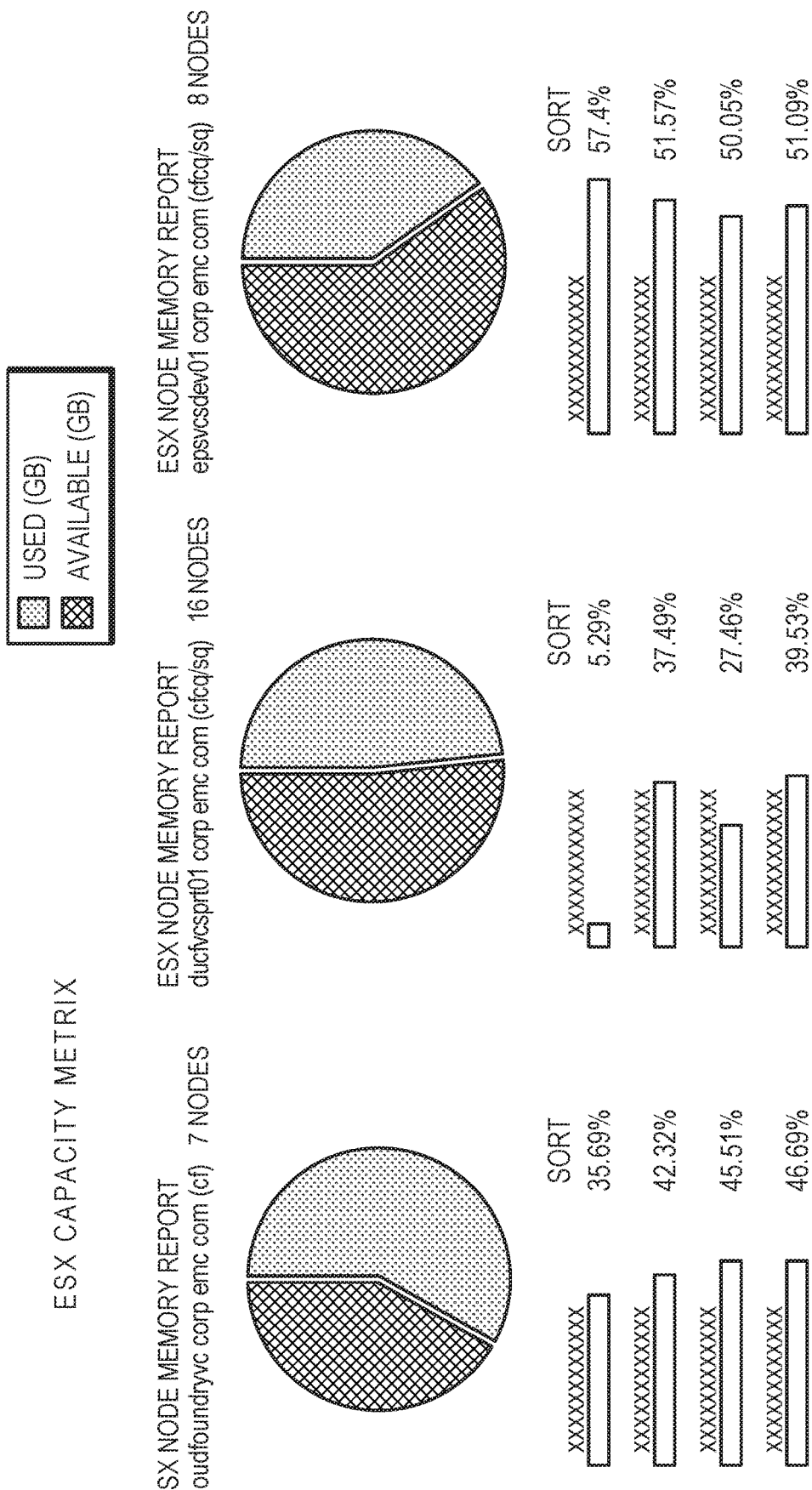
FIG. 7 shows an exemplary consolidated report created using embodiments herein.
Figure 8:
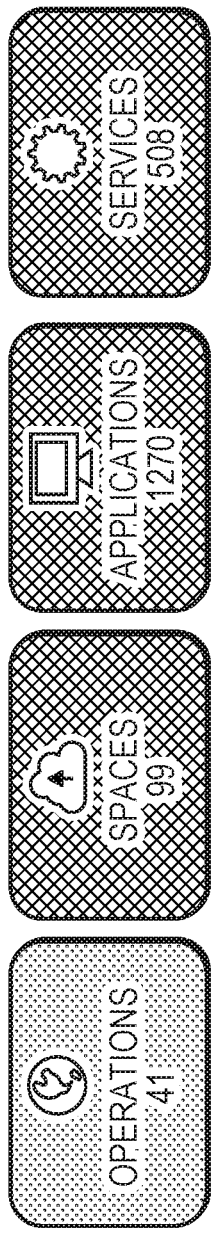
FIG. 8 shows an exemplary consolidated report created using embodiments herein.

FIGS. 6-8 provide example embodiments of consolidated reports that could be provided 514 to users either in real-time or at some future point in time. The resource usage metrics used to create these consolidated reports can be stored, as noted above, with reference to database 422.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A system for providing a consolidated view of a Platform-as-a-Service (PaaS) environment running on a cloud network comprising:
   a. an analysis system including one or more processors coupled to the PaaS environment;
   b. computer-executable program logic encoded in a memory of one or more computers enabled to analyze information using the analysis system, wherein the computer-executable program logic is configured for the execution of:
   c. measuring one or more resource usage metrics for each of a plurality of building blocks within a plurality of foundations within the PaaS environment, the plurality of building blocks comprising a router, a cloud controller, a messaging platform, and a cloud foundry bosh;
   d. consolidating the one or more resource usage metrics into a report; and
   e. providing the consolidated report to an end user.

2. The system of claim 1 wherein the one or more resource usage metrics is one or more of: a memory usage, a disk usage, a number of hyper-text transfer protocol (HTTP) transactions, a throughput value for each HTTP transaction, a memory usage value for each of a plurality of applications running within the plurality of foundations, an occurrence of a crash event for one of the plurality of applications, a PaaS ecosystem alert, a value metric, a router usage, a cloud controller usage, or a Traffic controller metric.

3. The system of claim 1 further configured for the execution of:
   a. comparing the one or more resource usage metrics to a threshold; and
   b. providing an alert if one or more of the resource usage metrics exceeds the threshold.

4. The system of claim 1 further configured for the execution of:
   a. attaching a different foundation-specific keyword to each of the plurality of foundations; and
   b. storing the plurality of keywords and the one or more resource usage metrics in a searchable database.

5. The system of claim 1 further configured for the execution of:
   a. forecasting an additional resource need based on the one or more resource usage metrics.

6. The system of claim 1 wherein the resource usage metrics are determined by examining metadata for each of the plurality of foundations.

7. A method for providing a consolidated view of a Platform-as-a-Service (PaaS) environment running on a cloud network comprising:
   a. measuring one or more resource usage metrics for each of a plurality of building blocks within a plurality of foundations within the PaaS environment, the plurality of building blocks comprising a router, a cloud controller, a messaging platform, and a cloud foundry bosh;
   b. consolidating the one or more resource usage metrics into a report; and
   c. providing the consolidated report to an end user.

8. The method of claim 7 wherein the one or more resource usage metrics is one or more of: a memory usage, a disk usage, a number of hyper-text transfer protocol (HTTP) transactions, a throughput value for each HTTP transaction, a memory usage value for each of a plurality of applications running within the plurality of foundations, an occurrence of a crash event for one of the plurality of applications, a PaaS ecosystem alert, a value metric, a router usage, a cloud controller usage, or a Traffic controller metric.

9. The method of claim 7 further comprising:
   a. comparing the one or more resource usage metrics to a threshold; and
   b. providing an alert if one or more of the resource usage metrics exceeds the threshold.

10. The method of claim 7 further comprising:
    a. attaching a different foundation-specific keyword to each of the plurality of foundations; and
    b. storing the plurality of keywords and the one or more resource usage metrics in a searchable database.

11. The method of claim 7 further comprising:
    a. forecasting an additional resource need based on the one or more resource usage metrics.

12. The method of claim 7 wherein the resource usage metrics are determined by examining metadata for each of the plurality of foundations.

13. A non-transitory computer readable medium with program instructions stored thereon for performing the following acts:
    a. measuring one or more resource usage metrics for each of a plurality of building blocks within a plurality of foundations within the PaaS environment, the plurality of building blocks comprising a router, a cloud controller, a messaging platform, and a cloud foundry bosh;
    b. consolidating the one or more resource usage metrics into a report; and
    c. providing the consolidated report to an end user.

14. The non-transitory computer readable medium of claim 13 wherein the one or more resource usage metrics is one or more of: a memory usage, a disk usage, a number of hyper-text transfer protocol (HTTP) transactions, a throughput value for each HTTP transaction, a memory usage value for each of a plurality of applications running within the plurality of foundations, an occurrence of a crash event for one of the plurality of applications, a PaaS ecosystem alert, a value metric, a router usage, a cloud controller usage, or a Traffic controller metric.

15. The non-transitory computer readable medium of claim 13 further configured for performing:
    a. comparing the one or more resource usage metrics to a threshold; and
    b. providing an alert if one or more of the resource usage metrics exceeds the threshold.

16. The non-transitory computer readable medium of claim 13 further configured for performing:
    a. attaching a different foundation-specific keyword to each of the plurality of foundations; and
    b. storing the plurality of keywords and the one or more resource usage metrics in a searchable database.

17. The non-transitory computer readable medium of claim 13 further configured for performing:
    a. forecasting an additional resource need based on the one or more resource usage metrics.

18. The non-transitory computer readable medium of claim 13 wherein the resource usage metrics are determined by examining metadata for each of the plurality of foundations.

* * * * *